(12) United States Patent
Maekawa et al.

(10) Patent No.: US 8,274,246 B2
(45) Date of Patent: Sep. 25, 2012

(54) INVERTER CONTROL DEVICE AND AC MOTOR CONTROL DEVICE USING THIS INVERTER CONTROL DEVICE

(75) Inventors: Katsumi Maekawa, Minato-ku (JP); Kazuya Yasui, Minato-ku (JP); Kentaro Suzuki, Minato-ku (JP); Yuichi Shiozaki, Minato-ku (JP)

(73) Assignee: Kabushiki Kaisha Toshiba, Tokyo (JP)

(*) Notice: Subject to any disclaimer, the term of this patent is extended or adjusted under 35 U.S.C. 154(b) by 547 days.

(21) Appl. No.: 12/524,367

(22) PCT Filed: Jan. 31, 2008

(86) PCT No.: PCT/JP2008/000123
§ 371 (c)(1),
(2), (4) Date: Jul. 24, 2009

(87) PCT Pub. No.: WO2008/096523
PCT Pub. Date: Aug. 14, 2008

(65) Prior Publication Data
US 2010/0109583 A1     May 6, 2010

(30) Foreign Application Priority Data
Feb. 8, 2007   (JP) ................................. 2007-029651

(51) Int. Cl.
*H02P 21/00* (2006.01)

(52) U.S. Cl. ............... 318/400.02; 318/432; 318/434
(58) Field of Classification Search ............ 318/400.02, 318/432, 434, 807
See application file for complete search history.

(56) References Cited

FOREIGN PATENT DOCUMENTS

| JP | 2000-341983 | 12/2000 |
|----|-------------|---------|
| JP | 2000 341983 | 12/2000 |
| JP | 2003 235270 | 8/2003 |
| JP | 2003-284399 | 10/2003 |
| JP | 2003 284399 | 10/2003 |

*Primary Examiner* — Lincoln Donovan
*Assistant Examiner* — Erick Glass
(74) *Attorney, Agent, or Firm* — Oblon, Spivak, McClelland, Maier & Neustadt, L.L.P.

(57) ABSTRACT

There is provided a current tracking PWM control circuit that directly generates PWM signals such that inverter output currents id, iq track PWM current references id, iq, using the results of comparison of the inverter output currents id, iq and PWM current references id, iq, in which, if current references id*, iq* exist, the result of adding the original current reference iq* and a correction signal iqC*, obtained by amplifying the deviation (iq*-iq) of the current reference iq* and iq, is used as the PWM current reference iq** on the q axis side for performing current control, but, in respect of the d axis side, the original current reference id* is used directly as the PWM current reference id** for performing current control.

6 Claims, 4 Drawing Sheets

INVERTER CONTROL DEVICE AND AC MOTOR CONTROL DEVICE USING THIS INVERTER CONTROL DEVICE

CROSS-REFERENCE TO RELATED APPLICATION

This application claims benefit of priority from Japanese application No. JP 2007-29651 filed Feb. 8, 2007, the entire content of which is incorporated by reference herein.

TECHNICAL FIELD

The present invention relates to an inverter control device and an AC motor control device using this inverter control device that controls a voltage inverter (or a voltage-type inverter) that is widely used in fields such as power, industry and transportation.

TECHNICAL BACKGROUND

A typical method of controlling the current of a voltage inverter is proportional integral control of the dq axis current. FIG. 1 is a layout diagram showing a prior art example of an AC motor control device using such current control. In FIG. 1, a voltage inverter 3 inputs a voltage that is smoothed by a smoothing capacitor 2 that smoothes the DC voltage from a DC power source 1, converts the DC power from this DC power source 1 to 3-phase AC power and supplies this as drive power to a motor 4. The motor current of the motor 4 is detected by Hall CTs 5U, 5V and 5W and input to a current detection circuit 13. The current detection circuit 13 outputs the output signals of the Hall CTs 5U, 5V and 5W to a co-ordinate conversion circuit 14 as detected currents iu, iv, iw in accordance with the scaling in the control circuit. Also, the rotor position of the motor 4 is detected by a rotation sensor 6 and input to a rotation detection circuit 7. The rotation detection circuit 7 finds and outputs an electrical angle signal θr and speed ωr corresponding to the position of the rotor from the output signal of the rotation sensor 6.

The deviation of the speed ωr detected by the rotation detector 7 with respect to a speed reference ωr* is found by a subtractor 8 and this speed deviation is input to a speed control circuit 9. The speed control circuit 9 amplifies the speed deviation that is output by the subtractor 8 and adjusts a torque instruction Trq* so that the speed ωr tracks the speed reference ωr*.

A flux weakening function generator 10 inputs a reinforcing flux reference Φ and the speed ωr; below a prescribed speed, the flux weakening function generator 10 outputs the reinforcing flux reference Φ without modification, but, above the prescribed speed, it outputs the reinforcing flux reference Φ** as a flux reference Φ* that is weakened in inverse proportion to the speed. A vector calculation circuit 11 calculates and outputs a torque-based current reference iq*, flux-based current reference id* and slip angle θs based on the flux reference Φ* and torque reference Trq*. An adder 12 adds the rotor position signal θr from the rotation detection circuit 7 and the slip angle θs* from the vector calculation circuit 11 and outputs a flux position signal θo to coordinate conversion circuits 14, 17. The co-ordinate conversion circuit 14 converts the detected currents iu, iv and iw from the current detection circuit 13 to a flux-based detected current id and torque-based detected current iq on the dq axis co-ordinates synchronized with the flux of the motor 4, by using the flux position signal θo from the adder 12.

Next, a subtractor 15d calculates the deviation of the flux-based detected current id from the co-ordinate converter 14 and the current reference id* of the d axis from the vector calculation circuit 11, and a subtractor 15q calculates the deviation of the torque-based detected current iq from the co-ordinate converter 14 and iq* of the q axis from the vector calculation circuit 11 and outputs these respectively to current control circuits 16d and 16q. The current control circuits 16d, 16q perform proportional integration and amplification on the current deviations that are output by the subtractors 15d, 15q and output the results to the co-ordinate conversion circuit 17 as voltage instructions vd*, and vq*. The co-ordinate conversion circuit 17 converts the voltage instructions vd*, vq* to voltage instructions vu*, vv*, vw* of a stator static co-ordinate system using the flux position signal θo and outputs these to a PWM control circuit 18. The PWM control circuit 18 delivers output to an inverter 3 that outputs pulse trains whose duty varies in accordance with the respective magnitudes of the voltage instructions vu*, vv* and vw*.

In the case of the AC motor control device shown in FIG. 1, the 3-phase AC currents iu, iv and iw that were detected are converted by the co-ordinate converter 14 to DC quantities id, iq on the dq axis co-ordinates based on the flux phase of the motor, and the deviations (id*-id), (iq*-iq) with regard to the respective current references are amplified by the proportional integration type current control circuits 16d, 16q. Voltage instructions vd*, vq* are then found in accordance with these amplified quantities and converted by the co-ordinate conversion circuit 17 to the stator static co-ordinates-based voltage instructions vu*, vv* and vw* using the flux position signal θo: these are then supplied as voltage references to the PWM control circuit 18 for, for example, triangular wave comparison PWM (pulse width modulation) and inverter control is performed with the PWM signal that is output by this PWM control circuit 18. That is, since the current is subjected to proportional integral control by conversion to DC quantities on the dq axis coordinates, control without steady deviation (or steady-state deviation) can be achieved even in the case of high-frequency AC current of frequency as high as some hundreds of Hz.

In current control systems for motors, control devices for voltage type inverters are available whereby the change of voltage on switching of pulse number in the case of high rotational speed/few pulses can be reduced compared with conventionally, by making the size of current ripples more uniform and smaller, and by reducing back pulses in comparison with conventionally. An example is Laid-open Japanese Patent Application No. 2003-235270 (Patent reference 1).

There are also available inverter control devices in which switching control is performed whereby PWM control is realized that makes possible PWM control with few harmonics in a steady condition and high-speed current control in a transitory condition. An example is Japanese Patent No. 3267524 (Patent reference 2).

Hereinbelow, we shall use the term current tracking PWM to refer to a PWM system of the current tracking type that generates a direct PWM signal such that the detected current tracks a current reference, as in Patent Reference 2.

FIG. 2 is a layout diagram (or a block diagram) showing another prior art example of an AC motor control device employing current control. The example of FIG. 2 is an example in which the dq axis current control section and the PWM control circuit 18 of the device of FIG. 1 are replaced by current tracking type PWM. In FIG. 2, the torque-based current reference iq* and flux-based current reference id* that are output from the vector calculation circuit 11 are converted to the stator static co-ordinate 3-phase current references iu*, iv* and iw* by the co-ordinate conversion circuit 19, their respective differences from the 3-phase detected currents iu, iv, iw obtained by the subtractors 20U, 20V and 20W and then supplied to the current tracking type PWM control circuit 21.

The current tracking type PWM control circuit 21 generates PWM signals such that the detected currents iu, iv, iw track the current references iu*, iv* and iw* and these PWM signals perform on/off control of the constituent switching elements of the inverter 3. With this system, no carrier wave is generated and the current response is extremely fast, since PWM signals are directly generated such that the current tracks the instruction values.

However, in the prior art example shown in FIG. 1, the current control response is affected by the modulation frequency of downstream PWM control. Also, if the integrator output on the q axis side exceeds the level corresponding to the q axis voltage that is actually capable of being output, the system falls into a condition in which current control cannot be achieved and, so, in the high-speed region, it is necessary to weaken the flux rather earlier: thus the output capacity of the motor is restricted and operating efficiency is lowered.

Also, in the case of the PWM control circuit 18, it is necessary to change over the PWM control system in accordance with the operating frequency of the motor. Specifically, in the range in which the operating frequency of the motor is low, asynchronous PWM is performed in which PWM signals are generated by comparing a triangular carrier wave of fixed modulation frequency and a voltage reference sine wave; however, when the operating frequency becomes high, approaching the frequency of the voltage reference sine wave and triangular carrier, fluctuation of the fundamental wave component contained in the PWM signal becomes large, so synchronous PWM is performed wherein voltage fluctuation is eliminated by maintaining the frequency of the triangular carrier wave at an integer multiple of the voltage reference sine wave. Furthermore, when the operating frequency becomes high, in the region in which operation is conducted with an extremely low number of pulses of the PWM signal per cycle of the operating frequency, such as for example 5 pulses or 3 pulses per cycle of the operating frequency, PWM is performed in accordance with a pulse pattern such as to preferentially remove low order harmonics such as fifth- or seventh-order harmonics, which have a large effect on the efficiency of the motor.

Now, in control combining dq axis current control and PWM control, the current control lags, so it is not possible to use current control to suppress voltage fluctuations arising from the low order harmonic voltages that arise from PWM control, or arising from frequency differences of the carrier wave and the voltage reference. It is therefore necessary to perform PWM control in such a way that the PWM control circuit 18 does not output PWM signals such as to produce undesirable harmonic voltages or voltage fluctuations.

However, in the event of changeover of the PWM control method, the output voltage changes and torque fluctuation is generated by the rapid change of current produced by this voltage change: in severe cases, the overcurrent protection system may be actuated. It is therefore necessary to effect changeover by selecting the phase such that abrupt current changes are not produced; however, during this changeover, transitional changeover control is necessary such as restriction of the current references. Such adjustment to restrict the current references is troublesome and, depending on the application, it is sometimes not possible to adopt a changeover system involving restriction of the current references.

In the case of the prior art example shown in FIG. 2, the current response is extremely fast, and the current control response is not limited by the modulation frequency as it is in the case of the system of FIG. 1. Also, since the PWM waveform is automatically and continuously changed over in accordance with the operating frequency, there is no need for deliberate changeover of the PWM control. Furthermore it is possible to shift continuously to single pulse operation without falling into a condition in which control is impossible in the high-speed region.

However, a characteristic drawback of current tracking PWM is the existence of a theoretically steady error (or steady-state error). Since, in current tracking PWM, the PWM signal is generated in a magnitude relationship in comparison with the instantaneous value, the proportional gain is infinitely large. Since if this PWM signal is directly used for operational purposes, the frequency of the PWM signal is too high, an insensitive zone provided by hysteresis or a delay time imposed by a timer is provided: however, a steady error is produced by such an insensitive zone or delay time. If the switching frequency is high, the steady error is small, but if the switching frequency is low the steady error increases and has a considerable effect on the performance of the motor.

A considerable merit of current tracking PWM is that high-speed response is obtained irrespective of the switching frequency. Large drives for industrial use and main motor drives for electric vehicles etc employ large-current switching elements, so switching losses are considerable. Consequently, the minimum switching frequency is adopted at which the necessary current response can be obtained, in order to moderately satisfy both performance and efficiency. Employment of current tracking PWM in such applications makes it possible to enormously improve performance, since the current response can be speeded up without needing to raise the switching frequency. Indeed, consideration may be given to improving both the performance and efficiency while positively lowering the switching frequency.

Next, FIG. 4 is a characteristic diagram showing the difference in voltage output capability of an inverter depending on the control system employed and the corresponding change of the flux weakening control region. In the example of FIG. 1, sine wave PWM control is performed by PWM control circuits 16*d*, 16*q* downstream of a proportional integral current control circuit 18. If the DC voltage of the inverter is assumed to be Edc, the maximum value of the line voltage (instantaneous value) that can be output by the voltage type inverter 3 is ±Edc. The maximum sine wave voltage is therefore |±Edc·sin θ|. This is the curve S0 in FIG. 4 (theoretical limit in the case of sine wave PWM), the flux instruction being the curve S0' (theoretical limit in the case of sine wave PWM).

However, as described above, if the output (voltage instruction) of the current control circuit 16*q* exceeds the voltage output capability, control becomes impossible. Consequently, in order to provide a voltage margin, a voltage instruction (saturation level of the current controller 16*q*) of for example 95% of the voltage output capability in sine wave PWM is employed, as indicated by the curve S1 (practical limit in the case of sine wave PWM) in the upper part of FIG. 4. The flux instruction in this case is the lower curve S1' (practical limit in the case of sine wave PWM) of FIG. 4.

The maximum voltage of a PWM inverter need not be a sine wave: at any rate, if the maximum is desired, this can be achieved without using PWM at all by outputting a square wave voltage, achieved by obtaining output in which for an electrical angle of 180° the positive side elements of an inverter 3 are turned ON and for the remaining 180° in the electrical angle the negative elements are turned ON. This mode will hereinbelow be referred to as single pulse mode. The magnitude of the fundamental component of the output line voltage is then expressed by $\pm(2\sqrt{3}/\pi) \cdot Edc \cdot \sin\theta$, the magnitude of the amplitude being $1.103 \cdot Edc$ i.e. about 10% greater than in the case of a sine wave.

Consequently, if the problem of loss of controllability that was experienced with the conventional system of FIG. 1 can be overcome and a fundamental wave voltage can be output corresponding to single pulse mode, taking into account the fact that conventionally a margin of about 5% was applied, the voltage can be raised by 15%. The curves of voltage and flux in this case are indicated by the curves S2 and S2' (in the case of single pulse operation) in FIG. 4.

Since a higher voltage can be achieved, the region of constant flux can be expanded up to a rotational speed that is 15% higher than conventionally, so the motor output capacity can be raised by 15% with exactly the same motor/inverter. Also, regarding the manner in which flux is weakened in the flux weakening region, weakening may be applied to a lesser degree. Since the torque generated by the motor is proportional to the product of the torque current and the flux-based current, if the flux is weakened the ratio of the current flowing in the motor to the torque is lowered. The fact that weakening may be applied to a lesser degree means that less current is required to generate the same torque i.e. efficiency can be improved.

With the system of FIG. 1, only sine wave PWM can be performed, so, rather than single-pulse current control, the current is indirectly controlled by changing over to another control system, not shown, such as phase control. If this is done, there is a large leap in the fundamental/lower-order harmonics of the voltage, so it is not possible to simply perform changeover but, instead, a complex changeover control process must be performed. Also, in the case of phase control, the current cannot be controlled at high speed, as in the case of current control.

With the system of FIG. 2, it was stated that a shift could be effected to single pulse operation without falling into a condition in which control could not be achieved in the high-speed region, but this is a manner of speaking focusing solely on the aspect of PWM control of current tracking PWM. Within the region in which sine wave PWM is possible, the current deviation is within the allowable error, but, outside the region in which sine wave PWM is possible, deviation increases. When the deviation increases, the voltage waveform approaches a single pulse. In the high-speed region in which sine wave PWM is impossible, the current deviation becomes so large that it is difficult to say that current control is being performed: however, rather than control becoming impossible, the current changes in response to changes in the current reference.

DISCLOSURE OF THE INVENTION

In view of the above, an object of the present invention is to provide an inverter control device and AC motor control device using this inverter capable of achieving current control in which PWM control changeover or changeover to phase control etc is unnecessary and with no steady error (or no steady-state error).

In order to achieve this object, an inverter control device according to the present invention is constructed as follows. Specifically, according to the present invention, there is provided a current tracking PWM control circuit that directly generates PWM signals such that inverter output currents id, iq track PWM current references id, iq, using the results of comparison of the inverter output currents id, iq and PWM current references id, iq, in which, if current references id*, iq* exist, the result of adding the original current reference iq* and a correction signal iqC, obtained by amplifying the deviation (iq*-iq) of the current reference iq* and iq, is used as the PWM current reference iq** on the q axis side for performing current control, but, in respect of the d axis side, the original current reference id* is used directly as the PWM current reference id** for performing current control.

BEST MODE FOR PUTTING THE INVENTION INTO PRACTICE

An embodiment of the present invention is described below with reference to the drawings.

Figure 1:
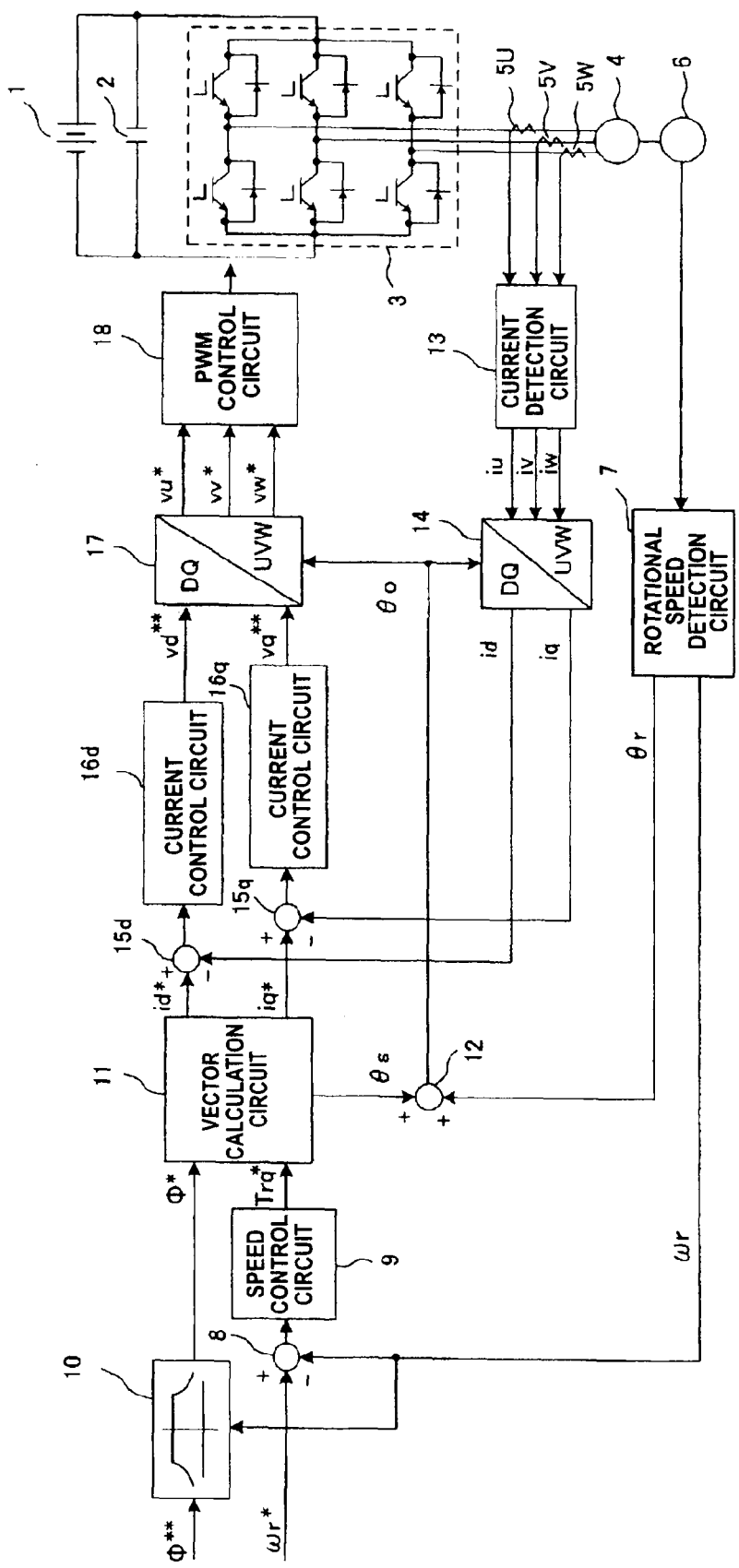
FIG. 1 is a layout diagram showing a prior art example of an AC motor control device employing current control.
Figure 2:
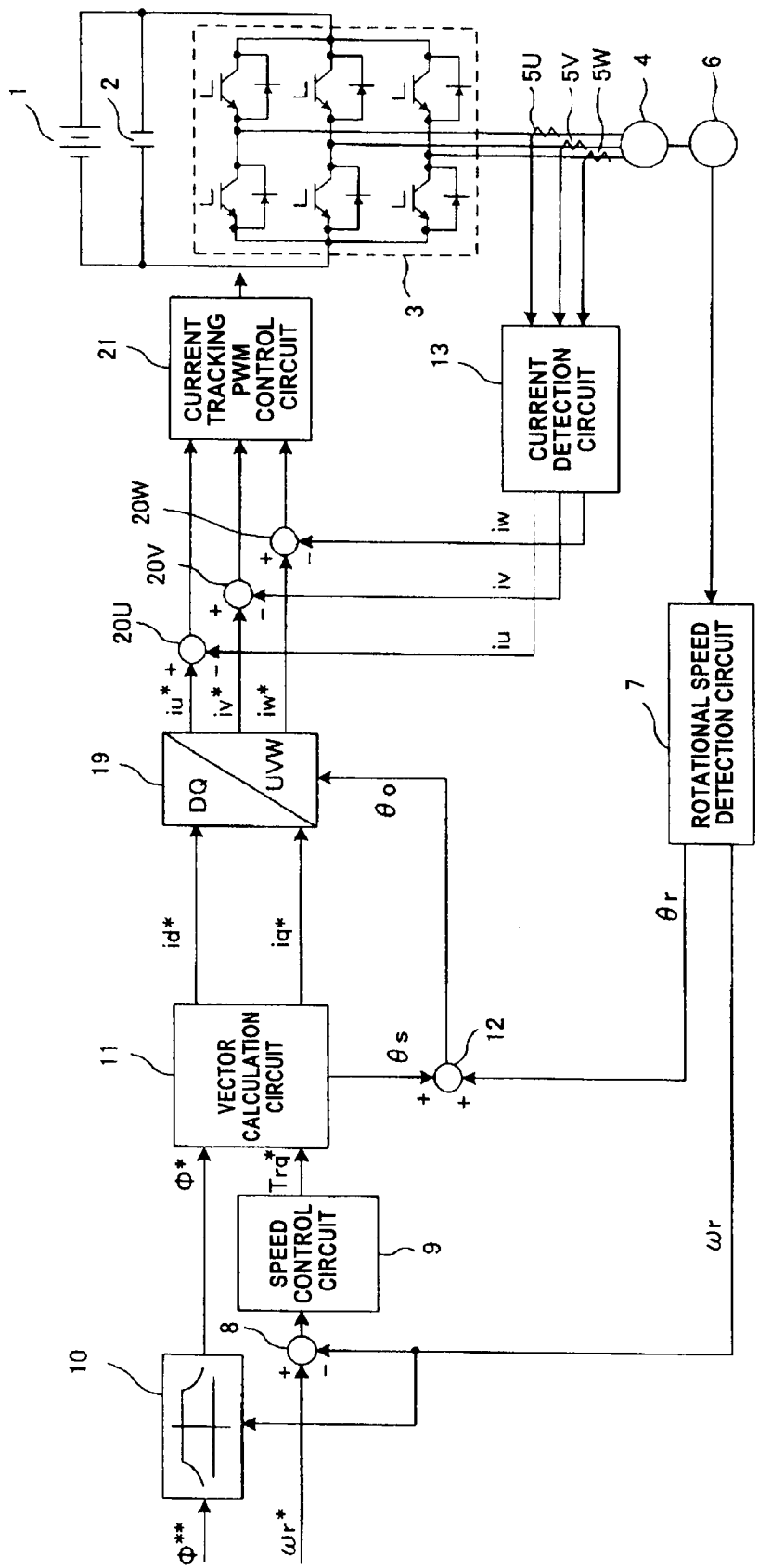
FIG. 2 is a layout diagram showing a further prior art example of an AC motor control device employing current control.
Figure 3:
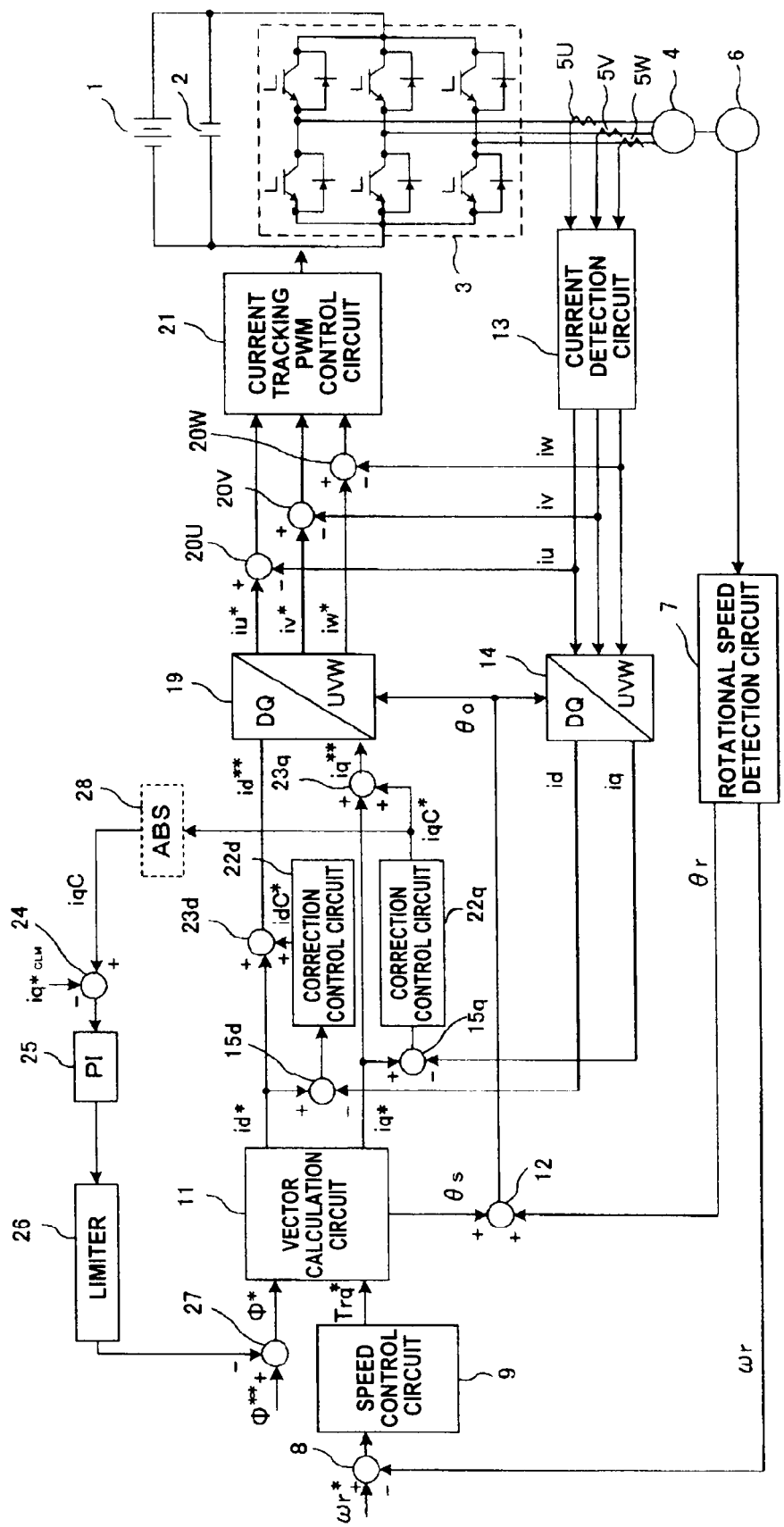
FIG. 3 is a layout diagram of an AC motor control device wherein an inverter control device according to an embodiment of the present invention is applied to control of a motor.
Figure 4:
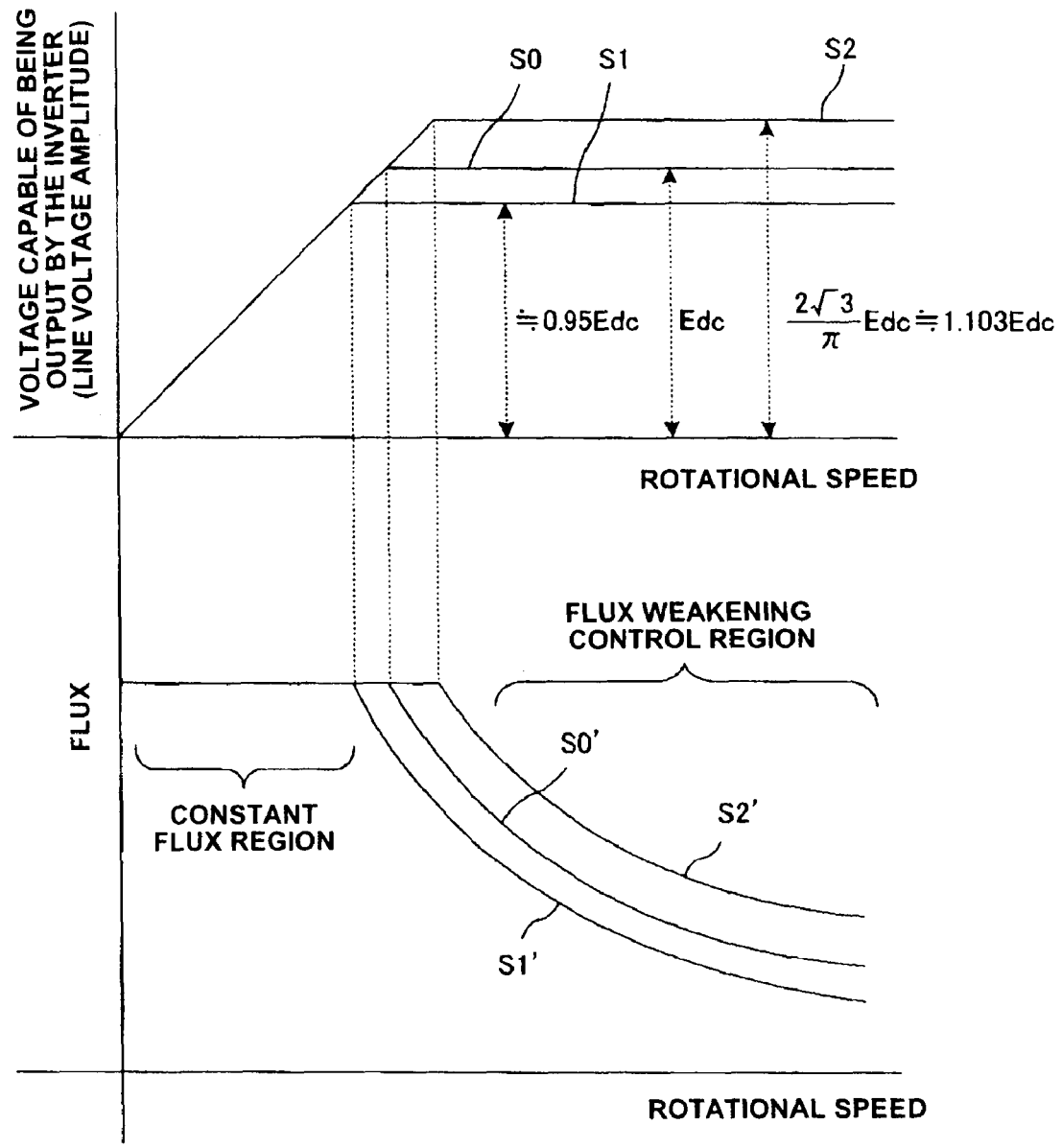
FIG. 4 is a characteristic plot showing the difference in voltage output capacity of an inverter using the control system and the corresponding change of the flux weakening control region.

FIG. 3 is a layout diagram of an AC motor control device wherein an inverter control device according to an embodiment of the present invention is applied to control of a motor. In FIG. 3, elements that are the same as elements shown in FIG. 1 and FIG. 2 are given the same reference symbols and the description thereof is not repeated. Correction control circuits 22d, 22q, adders 23d, 23q, a subtractor 24, a flux weakening control circuit 25, a limiter 26, a subtractor 27 and absolute value circuit 28 are newly provided.

The correction control circuits 22d, 22q are provided in order to eliminate the steady deviation (or steady-state error): the correction control circuit 22d amplifies the current deviation (id*-id) of the current reference id* that is input to the subtractor 15d and the output current id that is output from the inverter 3, and outputs the result to the adder 23d. The correction control circuit 22q amplifies the current deviation (iq*-iq) of the current reference iq* that is input to the subtractor 15q and the output current iq that is output from the inverter 3, and outputs the result to the adder 23q and also outputs the result to the absolute value circuit 28a. The adder 23d adds the original current reference id* to the correction signal idC* that is output by the correction control circuit, and outputs this to the coordinate conversion circuit 19 as the d axis side PWM current reference id**. The adder 23q adds the original current reference iq* to the correction signal iqC* that is output by the correction control circuit, and outputs this to the coordinate conversion circuit 19 as the q axis side PWM current reference iq**.

The absolute value circuit 28 obtains the absolute value of the q axis correction signal iqC*; the subtractor 24 calculates the difference between the absolute value of the q axis correction signal iqC* and its limiting value iq*$_{CLIM}$, and outputs the result to a flux weakening control circuit 25. The flux weakening control circuit 25 amplifies the output of the subtractor 24 and outputs this to the limiter 26. The limiter 26 sets the lower limit of the output of the flux weakening control circuit 25 as 0. The output of the limiter 26 is input to a subtractor 27; the subtractor 27 subtracts from the flux reinforcing instruction value Φ the signal obtained through the limiter 26 derived from the flux weakening control circuit 25** and outputs a flux instruction Φ* in accordance with the condition of the motor 4.

Next, the operation will be described. The motor current detection values iu, iv, iw that are output from the current detector 13 are converted to quantities id, iq in terms of dq axis co-ordinates by the co-ordinate conversion circuit 14 and the deviations with respect to the current references id*, iq* that are output from the vector calculation circuit 11 are found by the subtractors 15*d*, 15*q*. The respective dq axis deviations are amplified by the correction control circuits 22*d*, 22*q* of the steady deviation (or steady-state error), to obtain the correction signals idC*, iqC*. The adders 23*d*, 23*q* then add the correction signals idC*, iqC* to the current references id*, iq* to obtain the corrected current references id, iq. The corrected current references id, iq are then converted by the co-ordinate conversion circuit 19 to obtain the 3-phase current references iu*, iv*, iw* on the stator static co-ordinates. The differences between the 3-phase current references iu*, iv*, iw* and the 3-phase detected currents iu, iv, iw are input to the current tracking PWM control circuit 21.

In this way, current control with no steady deviation (or no steady-state error) can be achieved in the medium/low-speed region of the motor 4. If the detected currents id, iq are smaller than the current references id*, iq*, the correction control circuits 22*d*, 22*q* increase the values of the correction signals idC, iqC that are output. In this way, the corrected current references id, iq of the current tracking PWM control circuit are increased, so the motor currents id, iq are increased by the current tracking PWM control circuit 21 and the differences with respect to the original current references id*, iq* are decreased. If the correction control circuits 22*d*, 22*q* have an integration element, even if the deviation that is output by the subtractors 15*d*, 15*q* is minute, this is integrated to correct the corrected current references id, iq, so a steady deviation of 0 can be achieved on both the d axis and q axis.

In the medium/low-speed region of the motor 3, the correction signal iqC* that is output by the correction control circuit 22*q* is minute, so the output signal of the weakening control circuit 25 becomes negative and is limited to the low limiting value of 0 by the limiter 26. Consequently, the reinforcing flux instruction Φ** is applied without modification as the flux instruction Φ* that is applied to the vector calculation circuit 11.

The induction voltage that is generated within the motor 4 is proportional to the product of the flux and the speed of rotation. Consequently, if the speed of rotation of the motor 4 is raised while the flux is controlled to be constant, the induction voltage (or induce voltage) increases in proportion to the speed of rotation. In current control, the motor terminal voltage is established by injection of current overcoming the induced voltage, so when the induced voltage becomes high, injection of current ceases. The detected currents id, iq cannot track the current references id*, iq*, so both the flux and torque assume values different from the design values (or prescribed values).

Consequently, above a prescribed rotational speed, flux weakening control is performed so as to weaken the flux instruction value in inverse proportion to the rotational speed. Since the induced voltage is proportional to the product of the flux and the rotational speed, the induced voltage above a prescribed rotational speed is controlled by the flux weakening control to be constant. In this way, current control of the entire range of rotational speed of the motor 4 becomes possible. It should be noted that, as described above, when current control is saturated, current control becomes impossible, so it is necessary to commence flux weakening early, leaving a margin in respect of the output voltage.

In the case of the AC motor control device of FIG. 3, in the case of low rotational speeds, the correction signals that are output by the steady deviation correction control circuits 22*d*, 22*q* have values that are smaller than the allowed error (hysteresis) of the current tracking type PWM control circuit 21. If rise in the rotational speed of the motor 3 makes it impossible to supply current, the correction signal iqC* on the q axis side that is output by the steady deviation correction control circuit 22*q* becomes larger than the allowed error. If the correction signal iqC* tries to exceed the correction signal limiting value iq*$_{CLIM}$, output of the subtractor 24 changes to positive, causing the output of the weakening control circuit 25 to start to increase. In this way, the flux instruction Φ* that is input to the vector calculator 11 becomes a value obtained by subtracting the output of the weakening control circuit 25 from the reinforcing flux instruction Φ**. The id* that is output from the vector calculation circuit 11 becomes smaller, so the motor flux Φ becomes smaller. In this way, increase of the induction voltage is restricted, and the value of the correction signal iqC is controlled to the limiting value iq*$_{CLIM}$.

Thus, by controlling the corrected current reference that is input into the current tracking type PWM control circuit 21 to be larger by iqC than the value it would normally have, the q axis current actually flowing in the motor 4 is controlled so as to be equal to the instruction value iq*. This is because, if the actual value is smaller than the instruction value iq*, iqC should continue to increase. Of course, this is because the flux is weakened to a level that permits control to be achieved such that the current iq is equal to the instruction value. Thus weakening control is employed of the minimum value that enables the current iq to be controlled to be equal to the instruction value. The capability to control the current iq is maintained by further weakening the flux as the rotational speed rises.

Next, since, with the control system of a voltage type inverter control device employed in the embodiment of the present invention, the induction voltage (or induced voltage) is employed at the stage at which the current deviation increases, the positional relationship of the steady deviation (or steady-state error) and the induction voltage is fixed, so the q axis current is necessarily smaller than the instruction value. Consequently, the output of the correction control circuit 22*q* of the steady deviation can only be delivered in the positive direction. The absolute value circuit 28 can therefore be dispensed with. However, since the output of the correction control circuit 22*q* of the steady deviation can never be negative, control cannot be adversely affected even if an absolute value circuit 28 is inserted. And on the other hand, if, for any unanticipated reason, a correction control signal of the opposite sign should be output, no flux weakening control would be performed in the absence of an absolute value circuit 28, resulting in the current deviation being allowed to increase; for reasons of safety therefore, it is desirable to insert an absolute value circuit 28.

It is also possible to dispense with the correction control circuit 22*d* of the steady deviation on the d axis side. As described above, most of the steady deviation appears on the q axis side. If the correction control circuit 22*d* is omitted, some steady error does appear, but, considering only the PWM aspect, a current in accordance with the current reference can be passed to the motor by compensating for the increase in current deviation in the high-speed region that is possible up to single pulse operation; so by raising the inverter output voltage, a considerable raising of output of the motor and an improvement in operating efficiency in the weakening control region can be achieved. That is, when the switching frequency is high and the steady deviation is basically small, the d axis side can be dispensed with.

With the embodiment of the present invention, the changeover of PWM control or changeover to phase control etc that is otherwise necessary becomes unnecessary. Also, by holding the steady portions of the deviations (id-id), (iq-iq) of the current references id, iq and the detected currents id, iq in the integrating elements of the correction control circuits 22d, 22q, currents can be passed that are equal to the id*, iq* that are output by the vector calculation circuit 11. In this way, high-precision current control becomes possible while employing current tracking PWM control, which provides excellent current response: high-performance vector control can therefore be implemented that provides both excellent precision and response.

Also, the flux of the motor 4 can be weakened by the minimum limiting amount that enables q axis current to flow. Whereas, in the conventional system combining PI control dq axis current control and triangular wave comparison PWM control, weakening had to be applied early in order that the q axis current control output (voltage reference) should never exceed the q axis voltage actually capable of being output, with the embodiment of the present invention, the flux is only weakened on detection of increase of the steady deviation due to current control i.e. on detection of the situation that the voltage has become insufficient for current control: voltage can therefore be output having a fundamental frequency/low-order harmonics close to those of a single pulse. Consequently, the output voltage can be raised by about 10% by the difference between the sine wave voltage and voltage in the case of a single pulse and, in addition, can be raised by the amount of the margin that was conventionally provided in the case of sine wave control: thus the output capacity can be raised by 10% or more and efficiency in the weakening region can be improved while using exactly the same motor/inverter as conventionally.

Also, the means for implementing elimination of the steady deviation in the embodiment of the present invention is not particularly restricted to the case where the load is a motor 4. Current control can be achieved with high precision and high-speed response using all voltage type inverters employing current tracking PWM control.

POSSIBILITIES OF INDUSTRIAL APPLICATION

With the present invention, changeover of PWM control or changeover to phase control etc is unnecessary and current control can be achieved without steady deviation.

The invention claimed is:

1. An AC motor control device comprising:
an inverter control device having a current tracking PWM control circuit that generates PWM signals such that inverter output currents (id, iq) track PWM current references (id, iq), using results of comparison of said inverter output currents (id, iq) and said PWM current references (id, iq), in which, if current references (id*, iq*) exist, a result of adding said current reference (iq*) and a correction signal (iqC*), obtained by amplifying a deviation (iq*-iq) of said current reference (iq*) and said inverter output current (iq), is used as said PWM current reference (iq**) on a q axis side for performing current control, but, in respect of a d axis side, said current reference (id*) is used directly as said PWM current reference (id**) for performing current control;
a flux weakening control circuit that amplifies a difference of said correction signal (iqC*) and a prescribed limiting value; and
a limiter that applies limitation such that an output of said flux weakening control circuit cannot become negative,
wherein vector control calculation is performed using a flux reference and torque reference, and a flux-based current reference (id*), torque-based current reference (iq*) and a slip angle θs are calculated, using a quantity obtained by subtracting a limiter output from a reinforcing flux reference as a new flux reference.

2. The AC motor control device according to claim 1, wherein said limiter imposes a lower limit of zero on an output of said flux weakening control circuit.

3. An AC motor control device comprising:
an inverter control device having a current tracking PWM control circuit that generates PWM signals such that inverter output currents (id, iq) track PWM current references (id, iq), using results of comparison of inverter output currents (id, iq) and said PWM current references (id, iq), in which results of adding current references (id*, iq*) and correction signals (idC*, iqC*), obtained by amplifying respective deviations (id*-id), (iq*-iq) of said current references (id*, iq*) and said currents (id, iq), are used as said PWM current references (id, iq) for performing current control;
a flux weakening control circuit that amplifies a difference of an absolute value of said correction signal (iqC*) and a prescribed limiting value; and
a limiter that applies limitation such that an output of said flux weakening control circuit cannot become negative,
wherein vector control calculation is performed using a flux reference and torque reference, and a flux-based current reference (id*), torque-based current reference iq*) and a slip angle θs are calculated, using a quantity obtained by subtracting a limiter output from a reinforcing flux reference as a new flux reference.

4. The AC motor control device according to claim 3, wherein said limiter imposes a lower limit of zero on an output of said flux weakening control circuit.

5. An AC motor control device comprising:
an inverter control device having a current tracking PWM control circuit that generates PWM signals such that inverter output currents (id, iq) track PWM current references (id, iq), using results of comparison of said inverter output currents (id, iq) and said PWM current references (id, iq), in which, if current references (id*, iq*) exist, a result of adding said current reference (iq*) and a correction signal (iqC*), obtained by amplifying a deviation (iq*-iq) of said current reference (iq*) and said inverter output current (iq), is used as said PWM current reference (iq**) on a q axis side for performing current control, but, in respect of a d axis side, said current reference (id*) is used directly as said PWM current reference (id**) for performing current control;
a flux weakening control circuit that amplifies a difference of an absolute value of said correction signal (iqC*) and a prescribed limiting value; and
a limiter that applies limitation such that an output of said flux weakening control circuit cannot become negative,
wherein vector control calculation is performed using a flux reference and torque reference, and a flux-based current reference (id*), torque-based current reference (iq*) and a slip angle θs are calculated, using a quantity obtained by subtracting a limiter output from a reinforcing flux reference as a new flux reference.

6. An AC motor control device comprising:

an inverter control device having a current tracking PWM control circuit that generates PWM signals such that inverter output currents (id, iq) track PWM current references (id, iq), using results of comparison of inverter output currents (id, iq) and PWM current references (id, iq), in which results of adding current references (id*, iq*) and correction signals (idC*, iqC*), obtained by amplifying respective deviations (id*-id), (iq*-iq) of said current references (id*, iq*) and said currents (id, iq), are used as said PWM current references (id, iq) for performing current control;

a flux weakening control circuit that amplifies a difference of an absolute value of said correction signal (iqC*) and a prescribed limiting value; and a limiter that applies limitation such that an output of said flux weakening control circuit cannot become negative, wherein vector control calculation is performed using a flux reference and torque reference, and a flux-based current reference (id*) torque-based current reference (iq*) and a slip angle θs are calculated, using a quantity obtained by subtracting a limiter output from a reinforcing flux reference as a new flux reference.

* * * * *